United States Patent Office.

No. 80,086

BARTHOLOMEW OERTLY AND XAVER FENDRICH, OF WASHINGTON CITY, DISTRICT OF COLUMBIA.

Letters Patent No. 80,086, dated July 21, 1868.

IMPROVED COMPOSITION FOR COATING METALS, &c.

*The Schedule referred to in these Letters Patent and making part of the same.*

TO ALL WHOM IT MAY CONCERN:

Be it known that we, BARTHOLOMEW OERTLY and XAVER FENDRICH, of Washington city, in the District of Columbia, have invented or discovered a new and useful Composition for Making Tiles, or for Coating Stone, Bricks, Iron, or Wood; and we do hereby declare the following to be a full, clear, and exact description of our invention, and of some of the purposes for which it may be used.

We are aware that silicates or soluble glass have been used in compositions for making artificial stone, and for coating brick or stone. To this we lay no claim, though we use the soluble glass as the cementive element of our composition. But we also use other material not hitherto known or used, as we propose; and our invention consists in the composition we produce, and not in the individual ingredients, as they may have, to a greater or less extent, been used in other mixtures or other processes.

To enable others skilled in the art to make and use our composition, we will proceed to describe the same, as made for the several purposes to which we apply it.

Our composition is made by mixing with the silicate, or soluble glass and saw-dust, marble-dust, or chalk, and when this material is added to the composition, a greater proportion of the soluble glass is required, so as to make a stiff paste of it. The proportions of saw-dust and marble-dust or chalk can be varied, and coloring-matter may be introduced into the mixture, when used for making floor-tiles, table-plates, or veneering, and may, if required, be polished. Before it is exposed to wet or the weather, it should be allowed to thoroughly dry and harden, after which it will resist wear and exposure.

When the saw-dust is left out of the composition, and the soluble glass and marble-dust or chalk alone are used, it makes a coating for stone, iron, or wood that is of the most adhesive and durable nature, and may be used either for the protection of the surface or for ornamentation, or both. The soluble glass and marble-dust make a very hard artificial stone, but would be too expensive to work up into large masses, but may be very economically used for surfacing stone, brick, iron, or wood, its adhesion to either being very great, so much so as not to be able to separate it by blows that will fracture the stone coated by it.

The composition is valuable as a fire-proof material, in coating any materials used in building, and the iron, when used, may serve as a frame or skeleton, to receive and hold the composition. The composition may be colored in imitation of any of the material used in structures, and highly polished or ornamented.

Artificial heat is not necessary in setting or hardening the material, as it will do so in the air, but under cover, until seasoned.

Marble-dust, from its granular formation, is peculiarly adaptable to the formation of the composition, the soluble silicate filling the most minute inequalities in it. Chalk, from its more pulverulent nature, does not afford so good a surface.

Having thus fully described our invention, what we claim therein as new, and desire to secure by Letters Patent, is—

A composition for coating stone, brick, iron, or wood, or for floor-tiles, or similar articles, composed of soluble glass and marble-dust, substantially as described.

B. OERTLY,
XAVER FENDRICH.

Witnesses:
A. B. STOUGHTON,
EDM. F. BROWN.